O. D. DANIELS.
GAGE GLASS HOLDER.
APPLICATION FILED MAY 5, 1919.
1,333,839.
Patented Mar. 16, 1920.
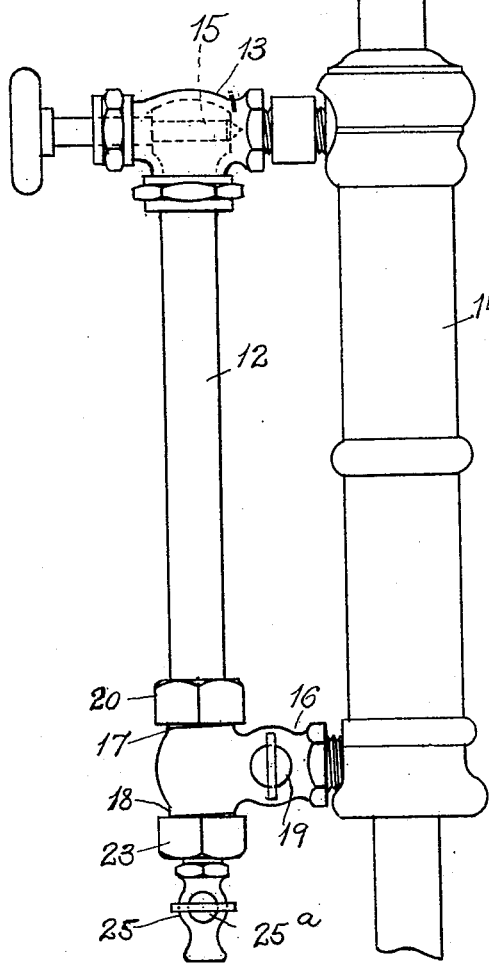
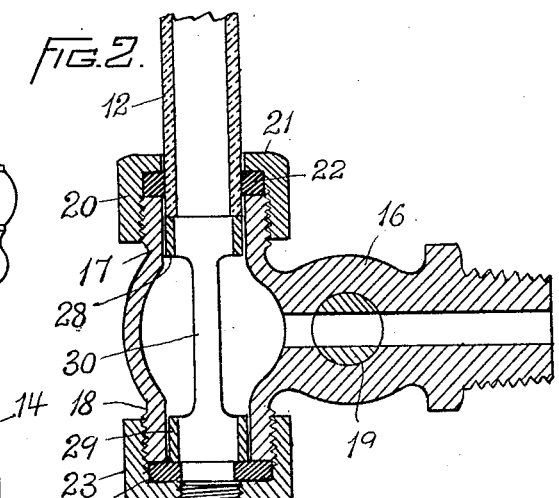
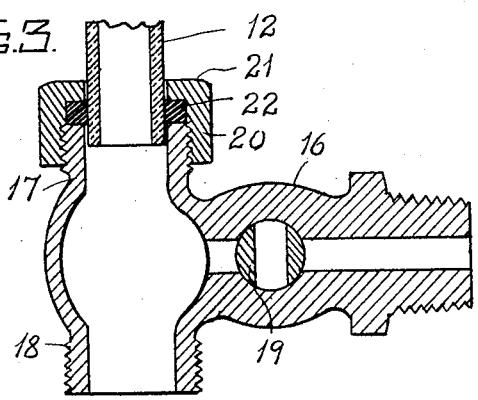
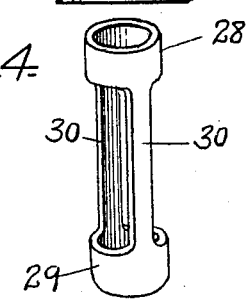
INVENTOR.
O. D. Daniels
by Wright, Brown, Quinby & May
ATTYS

UNITED STATES PATENT OFFICE.

OLIVER D. DANIELS, OF HENNIKER, NEW HAMPSHIRE.

GAGE-GLASS HOLDER.

1,333,839.  Specification of Letters Patent.  Patented Mar. 16, 1920.

Application filed May 5, 1919. Serial No. 294,907.

*To all whom it may concern:*

Be it known that I, OLIVER D. DANIELS, a citizen of the United States, residing at Henniker, in the county of Merrimack and State of New Hampshire, have invented new and useful Improvements in Gage-Glass Holders, of which the following is a specification.

This invention relates to gages for indicating the height of liquid in a receptacle such as a steam boiler, the gage comprising fluid-conducting fittings connected with the receptacle at different heights, and an upright glass gage tube extending between and communicating with said fittings, the liquid level in the gage tube being the same as that in the receptacle with which said fittings are connected.

The invention has for its object to provide improved means enabling the gage tube to be conveniently cleaned by a swab inserted in its lower end, while the tube is in its operative position.

The invention is embodied in the improvements which I will now proceed to describe and claim.

Of the accompanying drawings forming a part of this specification,—

Figure 1 is a side elevation of a water column provided with a gage embodying the improvements.

Fig. 2 is a sectional view on a larger scale, of a portion of the structure shown by Fig. 1.

Fig. 3 is a view similar to Fig. 2, the removable closure and the strut, hereinafter described, being removed.

Fig. 4 is a perspective view of the strut.

The same reference characters indicate the same parts in all of the figures.

In the drawings, 12 represents an ordinary glass gage tube, 13 represents an upper fitting in which the upper end of the tube is inserted, the fitting being provided with suitable means for forming a fluid tight joint around the tube, and with means for engaging a fluid receptacle such as an ordinary water column 14, connected at its upper and lower ends respectively with the steam and water spaces of a steam boiler. The said fitting is also provided with a valve member 15, adapted to close the passage through the fitting at a point between the gage tube and the receptacle. Since the fitting thus briefly described is well known, fuller illustration and description thereof is deemed unnecessary.

In carrying out my invention, I provide the improved means next described for supporting the lower end of the tube, connecting said end with the receptacle, and permitting access to the tube for cleaning purposes. 16 represents the tubular shank portion, and 17 and 18 the upper and lower tubular alined branches of a T-shaped fitting. The shank portion 16 constitutes a valve casing and is provided with a rotary valve member 19, and with an externally threaded end portion adapted to be screwed into the receptacle 14.

The upper branch 17 is formed to receive the lower end of the gage tube and is externally threaded to engage a nut 20. Said nut has an annular flange 21, bearing on a compressible washer 22 inserted in the nut, and surrounding the gage tube. When the nut is screwed downward, the washer is compressed and caused to grip the tube, and not only form a fluid-tight joint around the tube, but also support the tube against downward movement when the strut hereinafter described is removed.

The lower branch 18 is externally threaded to engage a nut 23 having an annular flange or head 24 which is tapped to engage the threaded shank of a pet-cock 25, having a rotary valve member 25ª. The head 24 bears on a compressible washer 26 inserted in the nut 23.

The nut 23, the pet-cock, when closed, and the washer 26, constitute a removable fluid-tight closure for the lower branch 18, the washer being compressed when the nut is screwed upwardly, and forming a fluid-tight joint between the head 24 and the branch 18. When the pet-cock is opened, the escape of fluid from the gage is permitted.

A removable strut is seated at one end on the said closure (and preferably on the portion thereof formed by the washer 26) and at the opposite end on the lower end of the gage tube. Said strut is formed to permit fluid to flow through the T-shaped fitting upwardly into the gage tube, and downwardly into the pet-cock, the form of the strut being such that it does not obstruct the passage formed by the alined branches 17 and 18, and is not liable to be clogged by sediment.

The strut is preferably composed of annular ends 28 and 29, bearing respectively on the gage tube and the washer, and an attenuated body connecting said ends and composed of two spaced apart members 30. The annular end 28 permits fluid to freely enter the gage tube, and the annular end 29 permits fluid to pass freely through the central opening of the washer 26, and into the pet-cock.

When the described closure is removed, as shown by Fig. 3, the strut drops out of the T-shaped fitting, and the gage tube, supported by the washer 22, against downward movement, is exposed, so that a swab may be inserted in it, and manipulated to remove any coating of foreign matter that may have been formed on the internal surface of the tube. Before the closure is removed, the valve member 15 in the upper fitting, and the valve member 19 in the lower fitting are closed, so that there is no communication between the gage and the receptacle 14.

Although the washer 22 grips the gage tube with sufficient force to prevent the tube from dropping when the strut is removed, it does not perform the function of positively supporting the tube, this function being performed by the strut.

I claim:

1. A device for supporting and conducting fluid to the lower end of a gage tube, comprising a T-shaped fitting having a valved shank adapted for attachment to a fluid receptacle, and upper and lower alined branches, the upper branch being formed to receive the lower end of the gage tube, a flanged nut engaged with an external screw thread on the upper branch and provided with a compressible washer adapted to grip the tube and form a fluid-tight joint around it, a nut engaged with an external screw thread on the lower branch, and provided with an annular head and with a compressible washer located within and resting on the said head and with a pet-cock, said nut, pet-cock and washer constituting a removable closure for the lower branch, and a strut seated at one end on the said washer, and at its opposite end on the gage tube, and formed to permit the free passage of fluid in one direction to the gage tube, and in the opposite direction to the pet-cock, the strut being removable with said closure to permit the insertion of a swab through said branches into a gage tube, held by said gripping washer.

2. The combination with a valved upper fitting having means for connection with a fluid receptacle and formed to receive the upper end of a glass gage tube, of a T-shaped lower fitting having a valved shank adapted for attachment to the same receptacle, and upper and lower alined branches, the upper branch being formed to receive the lower end of the gage tube, a flanged nut engaged with an external screw thread on the upper branch and provided with a compressible washer adapted to grip the tube and form a fluid-tight joint around it, a nut engaged with an external screw thread on the lower branch and provided with a compressible washer and a pet-cock, said nut, washer and pet-cock constituting a movable closure for the lower branch, and a strut seated at one end on a member of said closure, and at its opposite end on the gage tube, and formed to permit the free passage of fluid in one direction to the gage tube, and in the opposite direction to the pet-cock, the strut being removable with said closure to permit the insertion of a swab through said branches into a gage tube held by said gripping washer.

In testimony whereof I have affixed my signature.

OLIVER D. DANIELS.